US007006073B2

(12) United States Patent
Lieu

(10) Patent No.: US 7,006,073 B2
(45) Date of Patent: Feb. 28, 2006

(54) ELECTRONIC DEVICE INCORPORATING A GENERIC USER INTERFACE

(75) Inventor: Winston Hong Lieu, Holmdel, NJ (US)

(73) Assignee: Mobicom Corporation, Holmdel, NJ (US)

(*) Notice: Subject to any disclaimer, the term of this patent is extended or adjusted under 35 U.S.C. 154(b) by 429 days.

(21) Appl. No.: 10/207,636

(22) Filed: Jul. 29, 2002

(65) Prior Publication Data

US 2004/0017361 A1    Jan. 29, 2004

(51) Int. Cl.
G09G 5/00        (2006.01)

(52) U.S. Cl. ..................................... 345/156; 361/679

(58) Field of Classification Search ........ 345/156–158, 345/163, 168, 173; 361/679–681; 455/557
See application file for complete search history.

(56) References Cited

U.S. PATENT DOCUMENTS

| 5,144,302 A | * | 9/1992 | Carter et al. ................... 341/20 |
| 5,865,546 A | * | 2/1999 | Ganthier et al. ............. 400/489 |
| 6,727,890 B1 | * | 4/2004 | Andres et al. ............... 345/168 |
| 6,788,285 B1 | * | 9/2004 | Paolucci et al. ............. 345/156 |
| 2002/0111189 A1 | * | 8/2002 | Chou ......................... 455/557 |
| 2002/0178343 A1 | * | 11/2002 | Tsai et al. ..................... 712/1 |
| 2004/0092141 A1 | * | 5/2004 | Salmon ....................... 439/91 |
| 2004/0204102 A1 | * | 10/2004 | kuehnel et al. .......... 455/562.1 |

* cited by examiner

*Primary Examiner*—Ricardo Osorio
(74) *Attorney, Agent, or Firm*—DeMont & Breyer, LLC

(57) ABSTRACT

An electronic device includes a generic user interface that is interoperable with at least two modules to create different types of electronic devices (e.g., a wireless handset, a personal digital assistant, etc.) or different models (having different features) of the same type of device. The generic user interface has a look and feel that is similar an existing consumer electronics device and maintains this look and feel regardless of which module is connected to it.

17 Claims, 4 Drawing Sheets

ELECTRONIC DEVICE INCORPORATING A GENERIC USER INTERFACE

FIELD OF THE INVENTION

The present invention relates to electronic devices in general, and, more particularly, to electronic devices that can perform multiple sets of functions.

BACKGROUND OF THE INVENTION

In order to respond to competitive pressures and to meet the escalating expectations of customers, manufacturers of consumer electronics devices regularly incorporate new features into their products. These new features, which are often the result of advances in circuit miniaturization, energy efficiency, and data and power storage capacities, have led to a steady stream of lightweight, compact, and feature-rich electronics devices that are both easier and more convenient to use than predecessor devices. This trend is evident in a variety of areas: wireless communications (e.g., wireless handsets, etc.), audio equipment (e.g., compact disc players, MP3 players, and digital radio devices, etc.), photography (e.g., digital cameras, etc.), personal digital assistants (PDA's), and even the ubiquitous remote control device.

A common feature or characteristic of electronics devices—especially consumer electronics—is a "man-machine" or "user" interface. The user interface enables the user to interact with the devices by supplying (e.g., keyboard, microphone, etc.) and receiving (e.g., display, speaker, etc.) information. The user interface for an electrical/electronic device is often unique to that device; other devices will have different user interfaces. Even when devices of the same type or category are designed by the same manufacturer, the design, the size, the use, and the look and feel of the user interface can vary significantly from one model to the next. And the result is a cost penalty, since the circuitry, software and packaging of the user interface are generally integral parts of the electronic device and therefore must be developed anew for each product.

SUMMARY OF THE INVENTION

The illustrative embodiment of the present invention is a portable electronics device having a generic user interface. The generic user interface can mechanically and electrically couple to any one of a plurality of function-specific modules. Each module contains circuitry/components for performing certain functions. While the replacement of one module with another changes the functionality of the portable electronic device, the interface with which the user interacts to operate the device does not change. Accordingly, the generic user interface provides a consistent look and feel to the operator.

BRIEF DESCRIPTION OF THE DRAWINGS

The various functions and advantages of the present invention will be better understood by reference to the detailed description of the various illustrative embodiments that follows, taken in conjunction with the accompanying drawings, in which.

DETAILED DESCRIPTION

The terms listed below are given the following definitions for use in this specification.

"Mode of operation" refers to a capacity to perform a set of tasks associated with a particular device (e.g., a wireless handset, a player of MP3 files, a personal digital assistant, etc.). A particular mode of operation can, for example, encompass the performance of tasks that are associated with several models of the same device type. Also, a mode of operation can encompass the performance of tasks that are performed by one model of a device one or more other models of the same device type. Furthermore, a mode of operation can encompass the performance of tasks that are uniquely associated with one type of device (e.g., tasks involved with initiating or receiving a call using a wireless terminal handset, etc.), as opposed to another mode of operation that encompasses a completely different set of tasks uniquely associated with another type of device (e.g., fast forwarding to a different track of a compact disc being audibly reproduced on a CD player, etc.).

"Housing" refers to a structure to which, upon which, or within which components are are mounted, attached or otherwise housed. In some variations, a housing can be implemented as a single integral structure, while in some other variations, a housing can be implemented as a number of constituent structures that are assembled, coupled, or otherwise interconnected.

Figure 2:
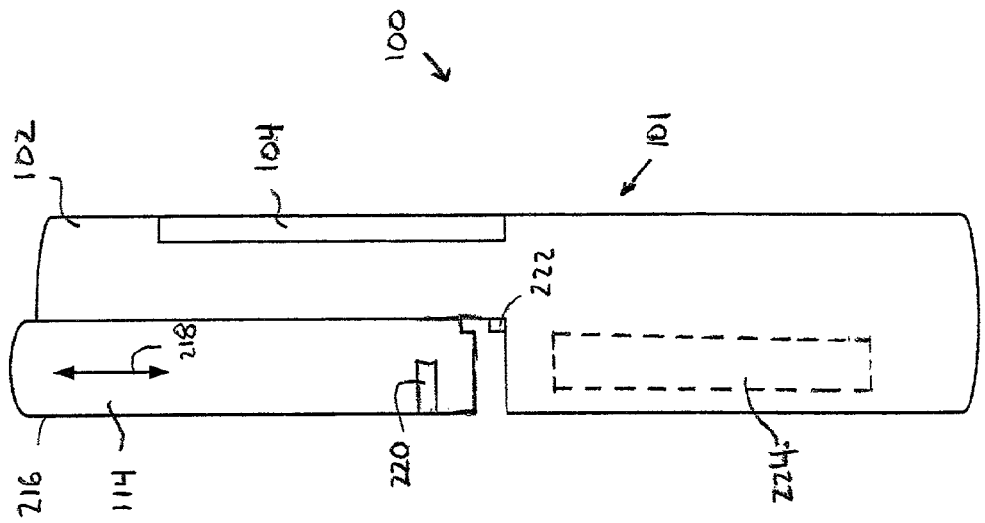
FIG. 2 depicts a side elevational view of the embodiment of FIG. 1 wherein the module is shown in a partially-detached position relative to the housing of the generic user interface.
Figure 1:
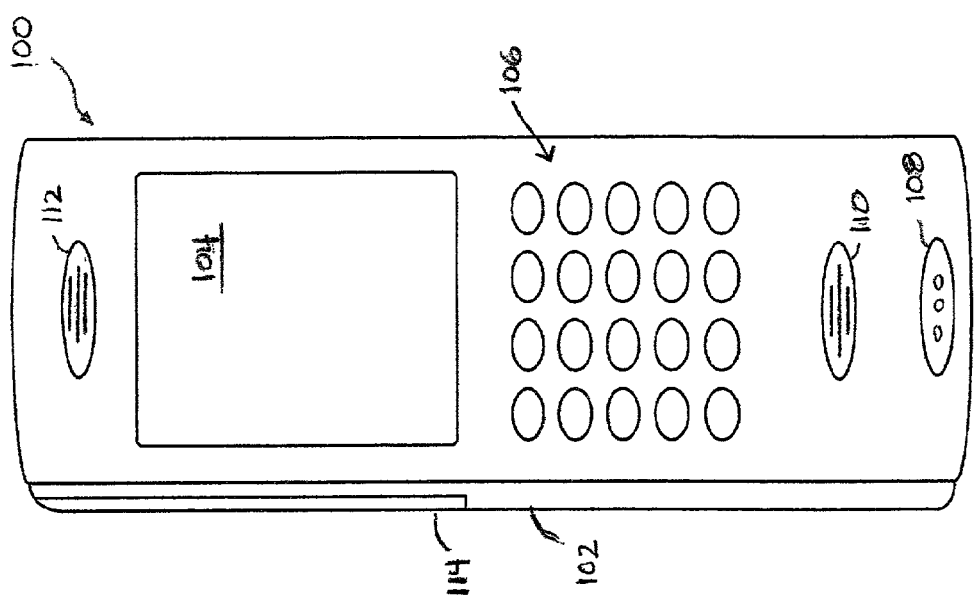
FIG. 1 depicts a front perspective view of an electronic device having a generic user interface and a functionally-specific, detachable module in accordance with an illustrative embodiment of the present invention.

FIGS. 1 and 2 depict electronic/electrical device 100 in accordance with the illustrative embodiment of the present invention. Device 100 includes main housing 102 and detachable module 114, interrelated as shown.

It is very desirable to provide device 100 with a "look and feel" that is consistent regardless of the specific mode of operation (e.g., wireless terminal, personal digital assistant, digital camera, etc.) being implemented. This is accomplished, in accordance with the illustrative embodiment, by:

1. providing device 100 generic user interface 101; and
2. endowing module 114 with a look that is similar to that of a conventional battery pack (e.g., of a wireless terminal handset, etc.).

With regard to point 1, generic user interface 101 advantageously includes at least:

main housing 102;

the general external appearance of device 100 itself (i.e., the shape of main housing 102 and the particular manner in which the externally-visible components [e.g., display 104, keypad 106, etc.] are integrated with main housing 102);

"standardized" electrical and mechanical connections 222 for receiving a circuit card (i.e., module 114);

components that the user visually interacts with (e.g., display 104 and keypad 106, etc.)

components that the user aurally/verbally interacts with (e.g., microphone 108 and speakers 110 and 112, etc.); and circuitry/components that are common to more than one type of electronic device or more than one mode of operation (e.g., battery, etc.).

TABLE I

Electronics Devices and Interface Components

| Product | Common Devices Utilized |
|---|---|
| GSM Handset | Display (e.g., LCD, etc.), keypad, speaker, microphone, power supply and battery, alerter (e.g., vibrating device, etc.) |
| CDMA Handset | Display keypad, speaker, microphone, power supply and battery, alerter (e.g., vibrating device, etc.) |
| TDMA Handset | Display, keypad, speaker, microphone, power supply and battery, alerter (e.g., vibrating device, etc.) |
| PHS Handset | Display, keypad, speaker, microphone, power supply and battery, alerter (e.g., vibrating device, etc.) |
| Personal Digital Assistant (PDA) | Display, touchscreen overlay, keypad, speaker, power supply and battery, alerter (e.g., vibrating device, etc.), IR transmitter |
| MP3 Player | Display, keypad, speaker, power supply and battery |
| Handheld GPS Receiver | Display, keypad, power supply and battery |
| Cordless Phone | Display, keypad, speaker, microphone, power supply and battery |
| Remote Control | Display, keypad, power supply and battery, IR transmitter |
| Digital Camera | Display, keypad, power supply and battery, IR transmitter, lens (optionally common with scanner but can be external to generic user interface) |
| Digital Radio | Display, keypad, power supply and battery, speaker |
| Handheld Computer | Display, keypad, power supply and battery |
| Satellite Receiver | Display, keypad, power supply and battery, alerter |
| Portable Scanner | Display, lens (optionally common with camera but can be external to generic user interface), power supply and battery, keypad |

Table I above lists some products that can share a common, generic user interface in accordance with the illustrative embodiment of the present invention. The components in common that might be appropriate for inclusion in generic user interface 101 are identified for each product type.

Certain components, such as, for example, display 104 and keypad 106 are widely used in electronics devices (see Table I). Because these components contribute significantly to the overall look, feel and operability of device 100, it is particularly desirable that they form part of generic user interface 101. Furthermore, all portable electronic devices require some form of power source, which is typically a battery and a regulated power supply. Accordingly, a battery (e.g., battery 224) is also part of generic user interface 101.

Acoustic components, such as a microphone and speakers, are required for a variety of electronic devices (e.g., wireless terminal devices: CDMA, TDMA, PHS, or GSM handsets; devices for storing and/or reproducing audible signals: digital radio, MP3 player, etc.) (see Table I). Consequently, the generic user interface also advantageously incorporates microphone 108, first speaker 112 and an optional second speaker 110.

Some other components that, although not listed in Table I, are advantageously included as part of generic user interface 101, include, without limitation, a real-time clock, charging plug, headset plug and backlighting.

Some variations of device 100 incorporate other, less "universal" components as part of the generic user interface 101. For example, as indicated in Table I, the use of an image-to-signal transducer such as, for example, a charge-coupled-device ("CCD") array and a lens is essentially limited to use in devices such as a digital camera and digital scanner. Nevertheless, in some variations of device 100, generic user interface 101 includes an image-to-signal transducer and/or a lens.

Point 2 (i.e., endowing module 114 with a look that is similar to that of a conventional battery pack) is now described. As already stated, it is very desirable for device 100 to have a look and feel that is familiar to users. To that end, in the illustrative embodiment, device 100 is provided with wireless-terminal handset-like packaging, which is now quite familiar to most users of consumer electronics. And in addition to being familiar with the look and feel of a wireless-terminal handset, a typical user will know how to attach and detach its battery pack.

As previously described, battery 224 of device 100 is advantageously placed within main housing 102 (i.e., it is part of the generic user interface). Consequently, a battery pack is not required for device 100 and is advantageously replaced by module 114. The module contains function-specific circuitry/components that, in conjunction with the circuitry/components of generic user interface 101, enables device 100 to perform one or more tasks (e.g., place a call, receive a call, etc.) according to a particular mode of operation (e.g., functioning as a wireless-terminal handset, etc.). The circuitry/components that compose module 114 are contained within housing 216.

Housing 216 is advantageously configured to look like and be manipulated like the battery pack of a conventional wireless-terminal handset so as to be familiar to the typical user. For example, FIG. 2 shows housing 216 to be movable, as indicated by arrow 218, into and out of electrical and mechanical mating registration with connections 222 of main housing 102.

Module 114 is advantageously readily detachable (e.g., via a release mechanism—not shown) from generic user interface 101. This ability to readily engage/disengage module 114 from generic user interface 101 enables module 114 to be replaced with another module that, in conjunction with circuitry/components of generic user interface 101, enables device 100 to function differently (i.e., in accordance with a different mode of operation than before). Detail concerning the structures/components 222 that are required for mechanical connection/registration (e.g., hooks and latches, etc.) and electrical registration (e.g., a blind-mating connector, etc.) are omitted since they are well known to those skilled in the art.

In the variation of device 100 that is depicted in FIG. 2, module 114 is provided with functionality that enables device 100 to operate as a GSM wireless terminal handset. In accordance with this example, module 114 incorporates antenna 220, which is advantageously configured as a bent slot antenna. As is well known in the art, antennas of this type transmit and receive polarized waves through a bent slot that is constructed by coating the interior walls of a cavity within housing 216 with a conductive material and defining a slot dimensioned and arranged as shown in FIG. 2. For a detailed discussion of slot antennas and their adaptation to portable wireless terminal handsets, see, U.S.

Pat. No. 4,975,711 entitled Slot Antenna Device for Portable Radiophone and issued to Kang-Hoon Lee on Dec. 4, 1990 and European Patent Application 0851530 A3 filed on Feb. 12, 1997 by Nedim Erkocevic, both of which publications are incorporated by reference herein. In some other variations, device 100 has a conventional dipole antenna rather than a bent slot antenna included as part of module 114. And, in yet further variations, antenna 220 is included in generic user interface 101.

Figure 3:
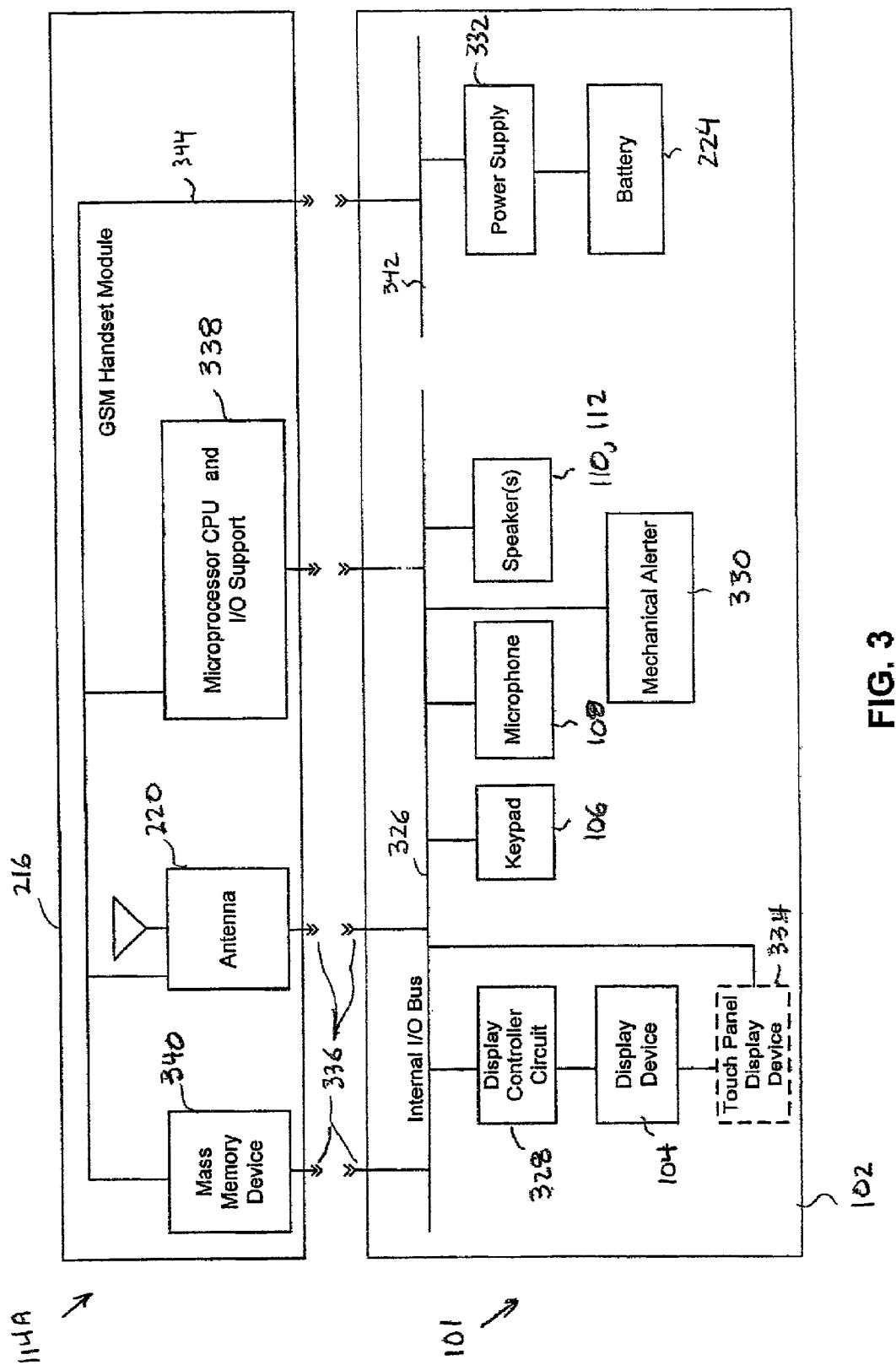
FIG. 3 depicts a block electrical-schematic diagram showing an illustrative allocation of components between a generic user interface and a wireless terminal module in accordance with the illustrative embodiment of the present invention.

FIG. 3 depicts, via a block schematic, further detail of the manner in which a module (i.e., module 114A) cooperates with generic user interface 101 of device 100 to provide a desired functionality or mode of operation. The functionality illustrated in FIG. 3 and provided, at least in part by module 114A, is that of a wireless-terminal handset. It is to be understood that the particular arrangement/location of components within main housing 102 and housing 216 that is shown in FIG. 3 was arbitrarily selected and is simply for the purpose of illustrating the contained circuitry/components.

In the illustrative arrangement shown in FIG. 3, input/output (I/O) bus 326 is disposed within main housing 102. Circuitry/components of generic user interface 101, and that is associated with at least two distinct modes of operation, are coupled (e.g., electrically connected, etc.) to bus 326. The circuitry/components of generic user interface 101 depicted in FIG. 3 include, without limitation, display 104, keypad 106, microphone 108, speakers 110 and 112, battery 224, display-controller circuit 328, mechanical alerter 330 (for vibrating main housing 102 as an alternate to audible alerting tones from speaker(s) 110 and 112), and power supply 332 (for regulating the power output of battery 224 in accordance with need). Each of the components associated with generic user interface 101 depicted in FIG. 3 is provided with power via power supply bus 342.

In the illustrative arrangement, touch-screen display overlay 334 is provided in addition to or instead of keypad 106. It is particularly advantageous to include overlay 334 in generic user interface 104 when a handheld-computer mode-of-operation and/or a PDA mode-of-operation is contemplated for device 100.

With continued reference to FIG. 3, mating electrical terminal connections, indicated generally at 336, electrically couple the circuitry/components within housing 216 of module 114A to I/O bus 326 when module 114A is properly coupled to (e.g., fully inserted in) main housing 102. A blind-mating connector can be used for this purpose.

In the illustrative embodiment, module 114A includes microprocessor and I/O support 338, antenna 220, and memory device 340. Memory device 340, which can include both RAM and ROM, is used for storing the instructions to be implemented by microprocessor 338 during operation of device 100 in a wireless-terminal handset mode, among other purposes. Each of the components within module 114A are provided with electrical power from power supply 332 via power supply bus 344.

It will be understood that, for some applications, there is latitude as to whether a particular circuit/component is associated with module 114 or with generic user interface 101. For example, in the illustrative embodiment, I/O bus 326 and power control bus 342 are disposed in main housing 102 as part of the generic user interface. In some variations of device 100, I/O bus 326 and power control bus 342 are disposed within housing 216 of module 114A. Likewise, while in the illustrative embodiment, microprocessor 338 is disposed in housing 216 of module 114A, in some variations, microprocessor 338 is disposed within main housing 102 forming a part of generic user interface 101. In such variations, the mode of operation of device 100 is determined, for example, by the specific software residing in memory storage device 340. In many cases, the precise placement and allocation of components between the generic user interface and module 114 will be influenced by both space-utilization considerations and whether a given component is applicable to only one, or more than one mode of operation.

As indicated above, device 100 is capable of functioning in many different modes of operation. For example, device 100 is capable of functioning in the manner of any one or more of devices listed in Table I. This functionality is provided, as previously described, by way of generic user interface 101 and function-specific modules 114. To provide the functionality of two different devices, a "first" module 114, which is coupled to main housing 102, is detached, removed and replaced with a "second" module that provides a different functionality.

For example, in some variations, device 100 provides, in a first mode of operation, the functionality of a wireless terminal handset, and provides, in a second mode of operation, the functionality of a digital camera. Within the context of the first mode operation, device 100 will be required to initiate and receive a telephone call. The specific set of functions that might be available to a user in performing those tasks admits of substantial variation. For example, a "high-end" model of wireless-terminal handset might incorporate a display and set of pushbuttons specifically configured to facilitate internet connectivity and navigation, while a "lower-end" model might not.

In some other variations, device 100 provides, in a first mode of operation, the functionality of a wireless terminal handset, and provides, in a second mode of operation, the functionality of a digital camera, and in a third mode of operation, provides the functionality of a personal digital assistant. In some other variations, device 100 provides, in a first mode of operation, the functionality of a remote control, and provides, in a second mode of operation, the functionality of a player of MP3 files. As long as generic user interface 101 supports the use of a module having a particular functionality, that module can be coupled to main housing 102 to provide an additional mode of operation to device 100.

Figure 4A:
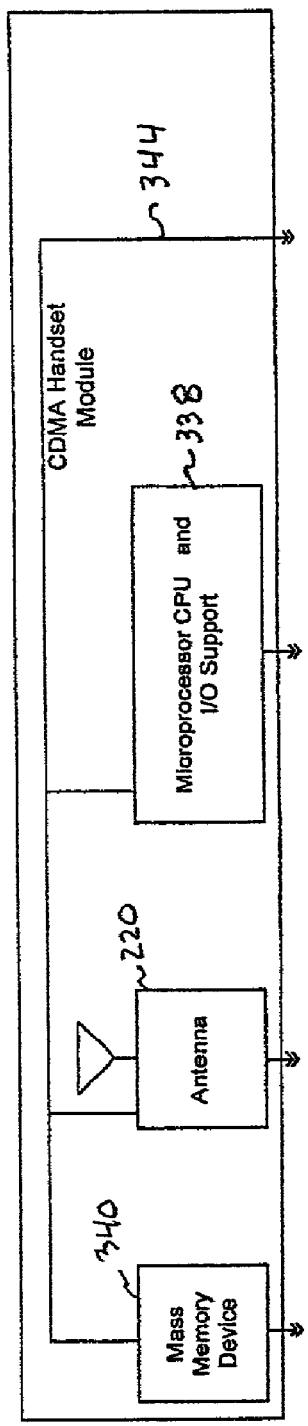
FIG. 4A depicts a block diagram of a first alternative module.
Figure 4B:
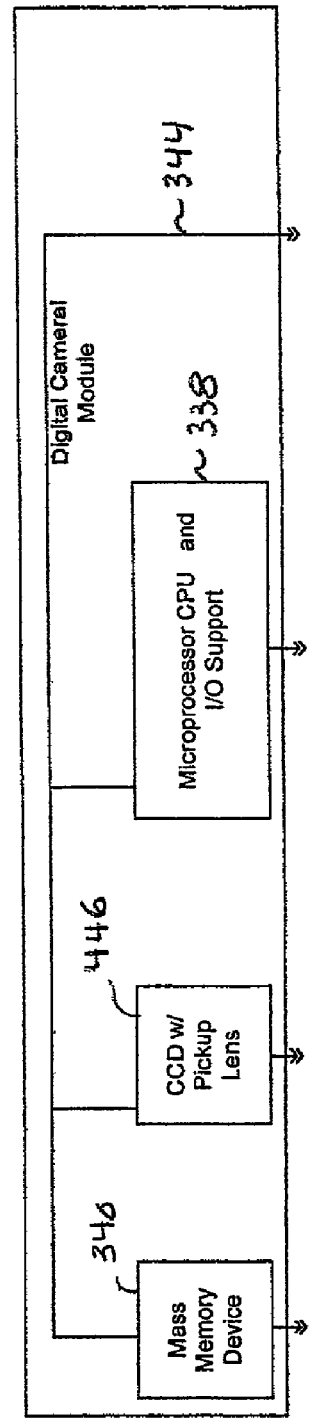
FIG. 4B depicts a block diagram of a second alternative module.

Examples of two modules that provide different functionality are shown in FIG. 4A and FIGS. 4B/5.

Module 114B depicted in FIG. 4A includes appropriate circuitry/components so that, in conjunction with generic user interface 101, device 100 operates as a code division multiple access (CDMA) wireless terminal handset. The distinction between this mode of operation and the GSM mode (see, e.g., module 114A) relates predominantly to the frequency band and network protocols employed in establishing network connectivity. As such, the internal construction (i.e., circuitry/components, etc.) of module 114A providing GSM functionality and module 114B providing CDMA functionality is quite similar. In particular, like module 114A, module 114B includes memory device 340, antenna 220, CPU and I/O support 338, and power supply bus 344.

Figure 5:
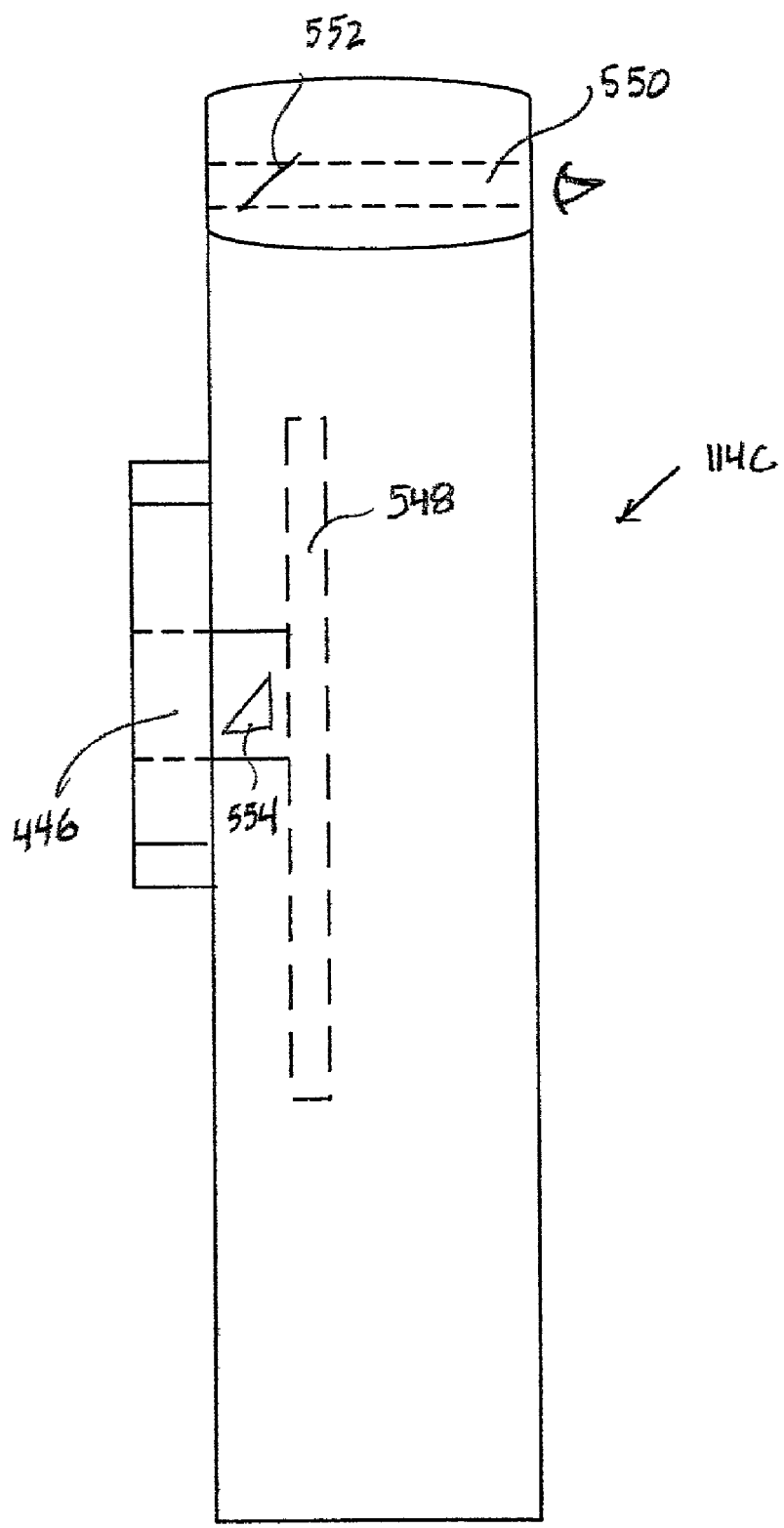
FIG. 5 is a side elevational view of the second alternative module of FIG. 4B, configured to provide digital-camera functionality in accordance with an illustrative embodiment of the present invention.

On the other hand, some of the components that are associated with "digital-camera" module 114C, as depicted in FIGS. 4B and 5, are different from those associated with module 114A (FIG. 3) and module 114B (FIG. 4A). In particular, in module 114C, digital-camera functionality is implemented by providing lens 446 and optical-to-electrical transducer 548 (e.g., a charge-coupled-device, etc.).

In addition to memory-storage device 340, digital-camera module 114C typically incorporates a form of re-usable, removable storage media (not depicted), such as a "flash card," to store pictures taken by device 100. In some variations, digital-camera module 114C includes an infrared transmitter for uploading digital images (obtained by device 100) to a personal computer or PDA using a suitable interface. And, as depicted in FIG. 5, digital camera module 114C advantageously includes a through-opening 550 or, alternatively, a mirror 552 and prism 554 arrangement for enabling a user to operate device 100 as a camera.

It will be appreciated that some of the components of generic user interface 101 will not be in service for certain uses of device 100 (due to differences between the various modes of operation). Consider, for example, the use of device 100 as a wireless handset versus the use of device 100 as a digital camera. Consequently, in some variations of the illustrative embodiment, certain components that are associated with generic user interface 101, such for example, display 104, keypad 106, etc., can be detachably mounted to main housing 102 for removal as desired. In this manner, main housing 102 accommodates different modules that perform different sets of operational functions, but is also re-configurable to accommodate application-to-application variations in generic user interface 101.

The use of generic user interface 101 and function-specific module 114 enables several other improvements in the design of device 100. For example, in a standard wireless GSM handset, some shielding is required between certain of the components. Consequently, various shielding is installed within the housing of the handset. On the other hand, in function-specific module 114, housing 216 can serve as the shielding. The reason for this is that many of the components that would otherwise be in a single housing (and need to be shielded from one another) are in two different housings (i.e., some in housing 216 of module 114 and some in main housing 102 of generic interface 101) in accordance with the illustrative embodiment of the present invention.

Furthermore, to the extent that larger, non-portable electronic devices provide the same electrical interface and at least some of the functionality of generic user interface 101, then module 114 can also be coupled to the non-portable electronic device to enhance its functionality. For example, a wireless GSM module can be coupled to a facsimile machine to enable it to transmit and receive faxes without a landline.

Additionally, since generic user interface 101 supports various modules 114, the electrical interface will include identification pins that enable generic user interface 101 and module 114 to recognize the functionality and capability of each other. This knowledge can be used, for example, to optimize current consumption, etc. In particular, either generic user interface 101 or module 114 or both can software and/or hardware that is capable of turning off components that are not required (e.g., for a player of MP3 files: turn off LCD and microphone, etc.).

Furthermore, since generic user interface 101 supports various modules 114, connector 222 advantageously includes sufficient electrical connections (e.g., pins, etc.) to accommodate any of the modules 114. Typically, all such electrical connections will not be used by any one module 114. Consequently, the connector associated with each module 114 will usually be smaller, and have fewer electrical connections, than connector 222. In some variations, modules 114 are provided with an "expandable" connector, wherein more electrical contacts are provided than is initially necessary. To the extent that additional functionality is provided to the module 114 at a later time, the "extra" electrical contacts can be used.

From the foregoing, it should be understood that the above-described embodiments are merely illustrative of the present invention and that many variations of the above-described embodiments can be devised by those skilled in the art without departing from the scope of the invention. For example, while in the illustrative embodiment, device 100 has the look and feel of a wireless terminal handset, in some variations thereof, device 100 has the look and feel of a different, but still familiar electronics device (e.g., that of a personal digital assistant, etc.). It is therefore intended that such variations be included within the scope of the following claims and their equivalents.

What is claimed is:

1. An electronic device comprising:
   a generic user interface, wherein said generic user interface includes a plurality of components and a main housing that incorporates said plurality of components;
   a first module comprising a first group of components, wherein said first module is physically adapted for detachable mechanical coupling to said main housing and detachable electrical coupling to at least some of said plurality of components of said generic user interface; and
   a second module comprising a second group of components, wherein said second module is physically adapted for detachable mechanical coupling to said main housing and detachable electrical coupling to at least some of said plurality of components of said generic user interface; wherein:
   a. when said first module is electrically coupled to said some components, said electronic device operates in accordance with a first mode of operation;
   b. when said second module is electrically coupled to said some components, said electronic device operates in accordance with a second mode of operation;
   c. said generic user interface must be coupled to at least one of said first module and said second module to operate; and
   d. said electronic device that is formed by coupling said generic user interface and said one module comprises a standalone device that is fully and independently operational.

2. The electronic device of claim 1 wherein said plurality of components comprises one or more components selected from the group consisting of a keypad, a speaker, a display, a battery and a microphone.

3. The electronic device of claim 1 wherein said first group of components comprises a memory device, an antenna, and a CPU.

4. The electronic device of claim 3 wherein said first mode of operation comprises operating as a wireless terminal handset.

5. The electronic device of claim 4 wherein said second group of components comprises a lens.

6. The electronic device of claim 5 wherein said second mode of operation comprises operating as a digital camera.

7. The electronic device of claim 1 wherein in said first mode of operation, said electronic device operates as a wireless terminal operating with a protocol selected from the group consisting of GSM, CDMA, TDMA, PHS, and wherein in said second mode of operation, said electronic device operates as a device selected from the group consisting of a personal digital assistant, a player of MP3 files, a cordless phone, a GPS device, a remote control, a digital camera, a digital radio, a handheld computer, a satellite receiver and a portable scanner.

8. The electronic device of claim 1 wherein in a first mode of operation, said electronic device operates as a digital camera, and wherein in said second mode of operation, said electronic device operates as a device selected from the group consisting of a personal digital assistant, a player of MP3 files, a cordless phone, a GPS device, a remote control, a digital radio, a handheld computer, a satellite receiver and a portable scanner.

9. The electronic device of claim 1 wherein said plurality of components includes a battery that is disposed within said main housing.

10. The electronic device of claim 9 wherein said first module comprises a first housing and said second module comprises a second housing, and wherein said first housing and said second housing is shaped like a detachable battery pack of a conventional wireless terminal handset.

11. The electronic device of claim 10 wherein said first housing and said second housing comprise electromagnetic shielding.

12. The electronic device of claim 1 further comprising an electrical interface by which said generic user interface electrically couples to said first module and said second module, wherein said electrical interface comprises identification pins, wherein said pins enable said generic user interface and said first module to recognize each other and enable said generic user interface and said second module to recognize each other.

13. The electronic device of claim 12 further comprising means for turning off components that are part of said generic user interface and that are not required for said first mode of operation or that are not required for said second mode of operation.

14. An electronic device comprising a first module, said first module having:
   a first housing that is structured and dimensioned for detachable coupling to a generic user interface that has a plurality of components, wherein said plurality of components are used to operate said electronic device in a first mode of operation and a second mode of operation; and
   a first group of components contained within said first housing, wherein, when said first housing is coupled to said generic user interface, said first group of components electrically couple to a first portion of said plurality of components; wherein:
   a. when said first housing is coupled to said generic user interface, said first group of components and said portion of said plurality of components are interoperable to provide one of either said first mode of operation or said second mode of operation;
   b. said electronic device cannot operate unless said first portion of said plurality of components in said generic user interface are coupled to said first group of components or a second portion of said plurality of components in said generic user interface are coupled to a second group of components that contained in a second housing of a second module; and
   c. said electronic device that is formed when said first housing is coupled to said generic user interface comprises a standalone device that is fully and independently operational.

15. The apparatus of claim 14 further comprising a second module, said second module having:
   a second housing that is structured and dimensioned for detachable coupling to a generic user interface, and
   a second group of components contained within said second housing, wherein, when said second housing is coupled to said generic user interface, said second group of components electrically couple to a second portion of said plurality of components.

16. The apparatus of claim 15 wherein when said first housing is coupled to said generic user interface, said electronic device operates in said first mode of operation, and when said second housing is coupled to said generic user interface, said electronic device operates in said second mode of operation.

17. The apparatus of claim 14 wherein said electronic device is a non-portable electronic device.

* * * * *